United States Patent
Wakita

(10) Patent No.: US 9,834,673 B2
(45) Date of Patent: Dec. 5, 2017

(54) POLYORGANOSILOXANE-CONTAINING GRAFT COPOLYMER, THERMOPLASTIC RESIN COMPOSITION, AND MOLDED PRODUCT

(71) Applicant: Mitsubishi Rayon Co., Ltd., Chiyoda-ku (JP)

(72) Inventor: Ayaka Wakita, Otake (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 14/900,883

(22) PCT Filed: Jun. 27, 2014

(86) PCT No.: PCT/JP2014/067132
§ 371 (c)(1),
(2) Date: Dec. 22, 2015

(87) PCT Pub. No.: WO2014/208716
PCT Pub. Date: Dec. 31, 2014

(65) Prior Publication Data
US 2016/0137836 A1    May 19, 2016

(30) Foreign Application Priority Data

Jun. 28, 2013  (JP) .................. 2013-136374

(51) Int. Cl.
C08L 69/00 (2006.01)
C08F 283/12 (2006.01)
C08L 51/08 (2006.01)

(52) U.S. Cl.
CPC ............ C08L 69/00 (2013.01); C08F 283/12 (2013.01); C08L 51/08 (2013.01)

(58) Field of Classification Search
CPC ..... C08L 69/00; C08L 2207/53; C08F 283/12
See application file for complete search history.

(56) References Cited

U.S. PATENT DOCUMENTS

| 7,956,105 B2 | 6/2011 | Lee et al. |
| 2003/0181573 A1 | 9/2003 | Miyatake et al. |
| 2006/0148946 A1* | 7/2006 | Lee .................. C08F 285/00 524/268 |
| 2007/0112157 A1 | 5/2007 | Hashimoto et al. |
| 2011/0160401 A1 | 6/2011 | Wakita et al. |
| 2013/0281586 A1 | 10/2013 | Otonari et al. |

FOREIGN PATENT DOCUMENTS

| JP | H02-238012 A | 9/1990 |
| JP | H11-189607 A | 7/1999 |
| JP | 2002-020443 A | 1/2002 |
| JP | 2002-531649 A | 9/2002 |
| JP | 2003-238793 A | 8/2003 |
| JP | 2004-331726 A | 11/2004 |
| JP | 2004-359889 A | 12/2004 |
| JP | 2011-179016 A | 9/2011 |
| KR | 10-2003-0029912 A | 4/2003 |
| KR | 10-2005-0120705 A | 12/2005 |
| KR | 10-2011-0057190 A | 5/2011 |
| WO | 00/34346 A1 | 6/2000 |
| WO | 2012/091024 A1 | 7/2012 |

OTHER PUBLICATIONS

International Search Report issued in corresponding International Patent Application No. PCT/JP2014/067132 dated Sep. 16, 2014.
Extended European Search Report issued in counterpart European Patent Application No. 14816654.9 dated Mar. 15, 2016.
Office Action issued in counterpart Korean Patent Application No. 10-2015-7036364 dated Feb. 20, 2017.

* cited by examiner

Primary Examiner — Kuo-Liang Peng
(74) Attorney, Agent, or Firm — Morgan, Lewis & Bockius LLP

(57) ABSTRACT

A resin composition having all of higher pigment colorability, low-temperature impact resistance, and flame retardance is provided. A graft copolymer is a polyorganosiloxane-containing graft copolymer formed by polymerizing one or more grafting vinyl monomers (b) in the presence of a rubber (A) containing polyorganosiloxane and a vinyl polymer, wherein the index of refraction of the rubber (A) is in the range of 1.47 to 1.56, and the volume-average particle size is in the range of 300 nm to 2000 nm. A resin composition contains the graft copolymer and a resin.

16 Claims, No Drawings

POLYORGANOSILOXANE-CONTAINING GRAFT COPOLYMER, THERMOPLASTIC RESIN COMPOSITION, AND MOLDED PRODUCT

FIELD OF THE INVENTION

The invention relates to a polyorganosiloxane-containing graft copolymer capable of increasing low-temperature impact resistance of a thermoplastic resin composition obtained via addition in a thermoplastic resin and capable of achieving high pigment colorability and flame retardance of a molded product obtained from the thermoplastic resin composition. Moreover, the invention relates to a thermoplastic resin composition having high low-temperature impact resistance, pigment colorability, and flame retardance and a molded product thereof.

DESCRIPTION OF RELATED ART

The aromatic polycarbonate resin is used as an engineering plastic and is excellent in, for instance, transparency, impact resistance, thermal resistance, and dimensional stability, and the aromatic polycarbonate resin is extensively applied in industries as a material in, for instance, the automotive field, office automation (OA) equipment field, and the electric/electronic field due to the excellent properties thereof.

Moreover, in recent years, the molded product obtained from the aromatic polycarbonate resin is applied mostly in, for instance, electrical/electronic equipment casing and home appliances, and sometimes the molded product is also used without painting for the object of cost reduction of the product, thus resulting in a greater demand for pigment colorability than before.

For instance, patent literature 1 provides a graft copolymer formed by performing graft polymerization on a composite rubber containing polyorganosiloxane rubber and alkyl poly(meth)acrylate rubber and a vinyl monomer, wherein the number-average particle size of the graft copolymer is 300 nm to 2000 nm, and the ratio of particles less than 300 nm in all of the particles is 20 volume % or less. However, in terms of application in, for instance, electrical/electronic equipment casing and home appliances, the graft copolymer recited in patent literature 1 is insufficient in pigment colorability or flame retardance.

Moreover, patent literature 2 provides a graft copolymer obtained by performing graft polymerization on at least one monomer unit selected from a vinyl cyanide monomer unit, an aromatic alkenyl unit, and an alkyl (meth)acrylate unit for a composite rubber-like polymer. The composite rubber-like polymer is obtained by compositing an aryl group-containing polyorganosiloxane and a polymer for which at least one monomer unit is selected from a vinyl cyanide monomer unit, an aromatic vinyl monomer unit, and an alkyl (meth) acrylate unit as a constituting component. However, the mass-average particle size of the graft copolymer recited in patent literature 2 is less than 300 nm, and therefore low-temperature impact strength or pigment colorability is insufficient in applications such as electrical/electronic equipment casing and home appliances.

CURRENT TECHNICAL LITERATURE

Patent Literature

Patent document 1: Japanese Patent Laid-Open Publication No. 2004-331726
Patent document 2: Japanese Patent Laid-Open Publication No. 2002-020443

SUMMARY OF THE INVENTION

Issues to be Solved by the Invention

An object of the invention is to provide a thermoplastic resin composition having all of higher pigment colorability, low-temperature impact resistance, and flame retardance and a molded product. Moreover, an object of the invention is to provide a polyorganosiloxane-containing graft copolymer capable of providing a thermoplastic resin composition having the properties and a molded product.

Means for Solving Issues

The issues are solved by any one of the following invention [1] to invention [17].

[1] A polyorganosiloxane-containing graft copolymer, wherein "test piece 1", "test piece 2", or "test piece 3" made according to the following "manufacturing conditions" are measured for Charpy impact strength [$kJ/m^2$], L*, and flame retardance under the following "measurement conditions" and have the following properties described in (1) to (3).

(1) The Charpy impact strength at −30° C. is 20 $kJ/m^2$ or more,
(2) L* is 8 or less,
(3) flame retardance is V1 or V0.

[Manufacturing Conditions of Test Piece 1 and Test Piece 2]:

(a) the polyorganosiloxane-containing graft copolymer is 3 parts by mass,
(b) an aromatic polycarbonate resin having a viscosity-average molecular weight of 24,000 (Iupilon S-2000F made by Mitsubishi Engineering-Plastics Corp.) is 97 parts by mass,
(c) Irganox 1076 (made by BASF) is 0.1 parts by mass,
(d) ADK STAB 2112 (made by ADEKA) is 0.1 parts by mass,
(e) Carbon black #960 (made by Mitsubishi Chemical Corporation) is 0.1 parts by mass.

The 5 materials (a) to (e) are prepared, and mixing and extrusion are performed under the condition of a screw rotation speed of 150 rpm via a devolatilizing extruder (PCM-30 made by IKEGAI Ltd.) heated to a roller temperature of 280° C. to obtain particles. The particles are molded via a 100 t injection molding machine (SE-100DU made by Sumitomo Heavy Industries, Ltd.) under the conditions of a barrel temperature of 280° C. and a mold temperature of 90° C. to obtain "test piece 1" (length: 80 mm, width: 10 mm, thickness: 4 mm, with a V-notch) and "test piece 2" (length: 100 mm, width: 50 mm, thickness: 2 mm).

[Manufacturing Conditions of Test Piece 3]:

(a) the polyorganosiloxane-containing graft copolymer is 5 parts by mass,
(b) an aromatic polycarbonate resin having a viscosity-average molecular weight of 24,000 (Iupilon S-2000F made by Mitsubishi Engineering-Plastics Corporation) is 89.5 parts by mass, (e) carbon black #960 (made by Mitsubishi Chemical Corporation) is 0.1 parts by mass, (f) an aromatic phosphate-based flame retardant (PX-200 made by Daihachi Chemical Industry Co., Ltd.) is 5 parts by mass, (g) polytetrafluoroethylene-containing powder (Metablen A-3800 made by Mitsubishi Rayon Co., Ltd.) is 0.5 parts by mass.

The 5 materials (a), (b), (e), (f), and (g) are prepared, and mixing and extrusion are performed under the condition of a screw rotation speed of 150 rpm via a devolatilizing extruder (PCM-30 made by IKEGAI Ltd.) heated to a roller temperature of 280° C. to obtain particles. The particles are molded via a 100 t injection molding machine (SE-100DU made by Sumitomo Heavy Industries, Ltd.) under the conditions of a barrel temperature of 280° C. and a mold temperature of 90° C. to obtain "test piece 3" (length: 127 mm, width: 12.7 mm, thickness: 1.6 mm).

[Measurement Conditions of Charpy Impact Strength]:

The Charpy impact strength was measured for "test piece 1" placed in an environment of −30° C. for 12 hours or more according to the method of International Standard Organization (ISO) 179.

[Measurement Conditions of L*]:

Tristimulus values (XYZ) are measured for "test piece 2" according to the following measurement conditions of Japanese Industrial Standards (JIS) Z8722. Then, the L* value is calculated using an International Commission on Illumination (CIE) color difference formula.

Apparatus: spectroscopic colorimeter SE-2000 (made by Nippon Denshoku Industries Co., Ltd., a method of after-sample light splitting of 0° to 45°), measurement range: 380 nm to 780 nm, measurement light source: C light (2° field of view).

[Measurement Conditions of Flame Retardance]:

Flame retardance is measured for "test piece 3" according to UL-94V (vertical flame test).

[2] A polyorganosiloxane-containing graft copolymer obtained by polymerizing grafting vinyl monomer (b) in the presence of a rubber (A) containing a polyorganosiloxane (A1) and a vinyl polymer (A2), wherein the index of refraction of the rubber (A) is in the range of 1.47 to 1.56, and the volume-average particle size of the rubber (A) is in the range of 300 nm to 2000 nm.

[3] The polyorganosiloxane-containing graft copolymer of [2], wherein the rubber (A) is a composite rubber containing the polyorganosiloxane (A1) and the vinyl polymer (A2).

[4] The polyorganosiloxane-containing graft copolymer of [2] or [3], wherein the polyorganosiloxane (A1) is formed by polymerizing an organosiloxane mixture containing organosiloxane, and the organosiloxane is cyclic dimethylsiloxane and/or a difunctional dialkyl silane compound.

[5] The polyorganosiloxane-containing graft copolymer of any one of [2] to [4], wherein a volume-average particle size of the rubber (A) is in the range of 400 nm to 1000 nm.

[6] The polyorganosiloxane-containing graft copolymer of any one of [2] to [5], wherein the content of the polyorganosiloxane (A1) in the rubber (A) is 40 mass % to 80 mass %, and the content of the vinyl polymer (A2) is 60 mass % to 20 mass %.

[7] The polyorganosiloxane-containing graft copolymer of any one of [2] to [6], wherein the vinyl polymer (A2) is formed by polymerizing a vinyl monomer (a2) for rubber using a free-radical polymerization initiator having a solubility of 5 mass % or less for water at 20° C.

[8] The polyorganosiloxane-containing graft copolymer of [7], wherein the free-radical polymerization initiator is selected from at least one of the group consisting of cumene hydroperoxide, diisopropyl benzene hydroperoxide, p-menthane hydroperoxide, t-butyl peroxy neodecanoate, t-butyl peroxyneoheptanoate, t-butyl peroxytrimethylacetate, 1,1,3,3-tetramethylbutyl peroxy-2-ethylhexanoate, t-butyl peroxy-2-ethylhexanoate, 2,2'-azobisisobutyronitrile, dimethyl 2,2'-azobis(2-methylpropionate), 2,2'-azobis(2,4-dimethylvaleronitrile), and 2,2'-azobis(2-methylbutyronitrile).

[9] The polyorganosiloxane-containing graft copolymer of any one of [2] to [8], wherein the vinyl polymer (A2) contains an aromatic vinyl monomer unit and/or an aryl (meth)acrylate unit for which the ester group is a phenyl group or a substituent phenyl group.

[10] The polyorganosiloxane-containing graft copolymer of any one of [2] to [9], wherein based on a total of 100 mass % of the rubber (A), the rubber (A) contains 0 mass % to 35 mass % of an alkyl (meth)acrylate unit.

[11] The polyorganosiloxane-containing graft copolymer of any one of [7] to [10], wherein based on a total of 100 mass % of the vinyl monomer (a2) for rubber, the vinyl monomer (a2) for rubber contains 0.1 mass % to 10 mass % of a crosslinking monomer.

[12] The polyorganosiloxane-containing graft copolymer of any one of [2] to [11], wherein the grafting vinyl monomer (b) contains at least one selected from the group consisting of an aromatic vinyl monomer, alkyl (meth) acrylate, a vinyl cyanide monomer, and aryl (meth)acrylate for which the ester group is a phenyl group or a substituent phenyl group.

[13] The polyorganosiloxane-containing graft copolymer of any one of [2] to [12], wherein the index of refraction of a polymer obtained by polymerizing the grafting vinyl monomer (b) is in the range of 1.50 to 1.60.

[14] A thermoplastic resin composition, containing the polyorganosiloxane-containing graft copolymer of any one of [1] to [13] and a thermoplastic resin.

[15] The thermoplastic resin composition of [14], wherein in 100 mass % of the thermoplastic resin composition, the content of the polyorganosiloxane-containing graft copolymer is 0.5 mass % to 90 mass %.

[16] The thermoplastic resin composition of [14] or [15], wherein the thermoplastic resin is a polycarbonate resin.

[17] A molded product obtained by molding the thermoplastic resin composition of any one of [14] to [16].

Effects of the Invention

The invention can provide a thermoplastic resin composition having all of higher pigment colorability, low-temperature impact resistance, and flame retardance and a molded product. Moreover, a polyorganosiloxane-containing graft copolymer capable of providing a thermoplastic resin composition having the properties and a molded product can be provided.

DESCRIPTION OF THE EMBODIMENTS

In the following, the invention is described in detail.

In the invention, "(meth)acrylate" refers to at least one of "acrylate" and "methacrylate". In the invention, the polyorganosiloxane-containing graft copolymer is sometimes referred to as "graft copolymer".

<Polyorganosiloxane-Containing Graft Copolymer>

The polyorganosiloxane-containing graft copolymer of the invention is preferably the following polymer (sometimes referred to as "graft copolymer 1 of the invention" hereinafter), i.e., a polymer obtained by polymerizing a grafting vinyl polymer (b) in the presence of a rubber (A) containing a polyorganosiloxane (A1) and a vinyl polymer (A2), and the index of refraction of the rubber (A) is in the range of 1.47 to 1.56, and the volume-average particle size of the rubber (A) is in the range of 300 nm to 2000 nm.

[Polyorganosiloxane (A1)]

The polyorganosiloxane (A1) is a polymer containing an organosiloxane unit as a constituent unit. The polyorganosiloxane can be obtained by polymerizing organosiloxane or an "organosiloxane mixture" containing organosiloxane and one or more of an optional component. The optional component can include, for instance, a siloxane-based crosslinking agent, a siloxane-based graft-linking agent, and a siloxane oligomer having a capping group.

The organosiloxane can adopt any one of chain organosiloxane, an alkoxy silane compound, and cyclic organosiloxane. In particular, the alkoxy silane compound and cyclic organosiloxane are preferred, and cyclic organosiloxane is more preferred due to high polymerization stability and high polymerization speed.

The alkoxy silane compound is preferably a bifunctional alkoxy silane compound, such as: dimethyl dimethoxy silane, dimethyl diethoxysilane silane, diethoxy diethyl silane, dipropoxy dimethyl silane, diphenyl dimethoxy silane, diphenyl diethoxy silane, methyl phenyl dimethoxy silane, or methyl phenyl diethoxy silane.

The cyclic organosiloxane is preferably a cyclic organosiloxane having 3-membered rings to 7-membered rings, such as: hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, or octaphenylcyclotetrasiloxane. These can be used alone or in a combination of two or more. Among these, in terms of readily control of particle size distribution, the main component is preferably octamethylcyclotetrasiloxane.

In terms of obtaining a graft copolymer having higher low-temperature impact resistance, the organosiloxane preferably adopts organosiloxane as cyclic dimethyl siloxane and/or a bifunctional dialkyl silane compound.

The cyclic dimethyl siloxane refers to cyclic siloxane having 2 methyl groups on silicon atoms, such as: hexamethylcyclotrisiloxane, octamethylcyclotetrasiloxane, decamethylcyclopentasiloxane, or dodecamethylcyclohexasiloxane. These can be used alone or in a combination of two or more.

The bifunctional dialkyl silane compound refers to a silane compound respectively having two alkoxy groups and alkyl groups on silicon atoms, such as: dimethyl dimethoxy silane, dimethyl diethoxy silane, diethoxy diethyl silane, or dipropoxy dimethyl silane. These can be used alone or in a combination of two or more.

The siloxane-based crosslinking agent preferably has a siloxane group. Via the use of a siloxane-based crosslinking agent, polyorganosiloxane having a crosslinked structure can be obtained. The siloxane-based crosslinking agent can include, for instance: a trifunctional or tetrafunctional silane-based crosslinking agent such as trimethoxymethyl silane, triethoxyphenyl silane, tetramethoxysilane, tetraethoxysilane, tetra-n-propoxysilane, or tetrabutoxysilane. In particular, a tetrafunctional cross-linking agent is preferred, and tetraethoxysilane is more preferred. In 100 mass % of the organosiloxane mixture, the content of the siloxane-based crosslinking agent is preferably 0 mass % to 30 mass %, more preferably 0.1 mass % to 30 mass %. By setting the content of the siloxane-based crosslinking agent to 0.1 mass % to 30 mass %, a graft copolymer having good low-temperature impact resistance can be obtained.

The siloxane-based graft-linking agent has a siloxane group and has a functional group capable of being polymerized with a vinyl monomer. Via the use of the siloxane-based graft-linking agent, a polyorganosiloxane having a functional group capable of being polymerized with a vinyl monomer can be obtained. Via the polyorganosiloxane having a functional group capable of being polymerized with a vinyl monomer, the polyorganosiloxane can be grafted with the later-described vinyl monomer (a2) for rubber and the grafting vinyl monomer (b) via free-radical polymerization.

The siloxane-based graft-linking agent can include the siloxane represented by formula (I).

[formula 1]

$$RSiR^1_n(OR^2)_{(3-n)} \quad (I)$$

In formula (I), $R^1$ represents a methyl group, an ethyl group, a propyl group, or a phenyl group. $R^2$ represents an organic group in the alkoxy group, and can include, for instance: a methyl group, an ethyl group, a propyl group, or a phenyl group. n represents 0, 1, or 2. R represents any group represented by formula (I-1) to formula (I-4).

[formula 2]

$$CH_2=C(R^3)-COO-(CH_2)_p- \quad (I-1)$$

$$CH_2=C(R^4)-C_6H_4- \quad (I-2)$$

$$CH_2=CH- \quad (I-3)$$

$$HS-(CH_2)_p- \quad (I-4)$$

In the formulas, $R^3$ and $R^4$ respectively represent hydrogen or a methyl group, and p represents an integer of 1 to 6.

The functional group represented by formula (I-1) can include, for instance, a methacryloyloxy alkyl group. The siloxane having the group can include, for instance, the following. β-methylacryloxyethyl dimethoxy methyl silane, γ-methylacryloxypropyl methoxy dimethyl silane, γ-methylacryloxypropyl dimethoxy methyl silane, γ-methylacryloxypropyl trimethoxy silane, γ-methylacryloxypropyl ethoxy diethyl silane, γ-methylacryloxypropyl diethoxy methyl silane, δ-methylacryloxybutyl diethoxy methyl silane . . . etc.

The functional group represented by formula (I-2) can include, for instance, a vinyl phenyl group. The siloxane having the group can include, for instance, vinyl phenyl ethyl dimethoxy silane.

The siloxane having the functional group represented by formula (I-3) can include, for instance: vinyl trimethoxy silane or vinyl triethoxy silane.

The functional group represented by formula (I-4) can include a mercaptoalkyl group. The siloxane having the group can include, for instance, the following. γ-mercaptopropyl dimethoxymethyl silane, γ-mercaptopropyl methoxy dimethyl silane, γ-mercaptopropyl diethoxymethyl silane, γ-mercaptopropyl ethoxy dimethyl silane, γ-mercaptopropyl trimethoxy silane . . . etc.

The siloxane-based graft-linking agents can be used alone or in a combination of two or more. Based on 100 mass % of the organosiloxane mixture, the content of the siloxane-based graft-linking agent is preferably 0 mass % to 20 mass %, more preferably 0.05 mass % to 20 mass %. By setting the content of the siloxane-based graft-linking agent to 0.05 mass % to 20 mass %, a graft copolymer having good low-temperature impact resistance can be obtained.

The so-called siloxane oligomer having a capping group refers to a siloxane oligomer having, for instance, an alkyl group at the terminal of an organosiloxane oligomer for stopping the polymerization of the polyorganosiloxane.

The siloxane oligomer having a capping group can include, for instance: hexamethyldisiloxane, 1,3-bis(3-glycidoxypropyl)tetramethyldisiloxane, 1,3-bis(3-aminopropyl)tetramethyldisiloxane, or methoxy trimethyl silane.

[Manufacturing Method of Polyorganosiloxane (A1)]

The manufacturing method of the polyorganosiloxane (A1) is not particularly limited, and can include, for instance, the following manufacturing method. First, an organosiloxane mixture containing organosiloxane, an optional siloxane crosslinking agent, an optional siloxane graft-linking agent, and an optional siloxane oligomer having a capping group is emulsified via an emulsifier and water to prepare an emulsion. Then, the mixture is polymerized at high temperature using an acid catalyst, and then a polyorganosiloxane latex is obtained by neutralizing the acid via an alkaline substance. Moreover, in the following description of the manufacturing method, the case in which an "organosiloxane mixture" is used as the raw material of polymerization is described, and the case in which the "organosiloxane" is used can also adopt the same manufacturing process.

In the manufacturing method, the preparation method of the emulsion can include, for instance: a method in which a homomixer is used to perform microparticulation via a high-speed rotational shear force, or a method in which, for instance, a homogenizer is used to perform microparticulation via the ejection force of a high-pressure generation machine so as to perform mixing via high-speed stirring. Among these, the method in which a homogenizer is used is preferred due to the narrowing of particle size distribution of the polyorganosiloxane latex.

The mixing method of the acid catalyst during polymerization can include, for instance: (1) a method in which an organosiloxane mixture, an emulsifier, and water are added together in entirety and mixed, (2) a method in which an aqueous acid catalyst solution is added in entirety in the emulsion of the organosiloxane mixture; or (3) a method in which the emulsion of the organosiloxane mixture is added dropwise in a high-temperature aqueous acid catalyst solution at a certain speed for mixing. In terms of readily control of the particle size of the polyorganosiloxane, a method in which the emulsion of the organosiloxane mixture is kept at high temperature and an aqueous acid catalyst solution is added in entirety is preferred.

The polymerization temperature is preferably 50° C. or more, more preferably 70° C. or more. Moreover, when an aqueous acid catalyst solution is added in entirety in the emulsion of the organosiloxane mixture to perform polymerization, the polymerization time is generally 2 hours or more, preferably 5 hours or more.

Then, cross-linking reaction between silanol is performed at a temperature of 30° C. or less. As a result, to increase crosslink density of the polyorganosiloxane, the latex formed can also be kept at a temperature of 30° C. or less for about 5 hours to about 100 hours after polymerization is performed at a high temperature of 50° C. or more.

In the polymerization reaction of the organosiloxane mixture, the latex can be neutralized to pH 6 to 8 via an alkaline substance such as sodium hydroxide, potassium hydroxide, or aqueous ammonia solution to end the reaction.

The emulsifier used in the manufacturing method is not particularly limited provided the emulsifier can emulsify the organosiloxane mixture, and an anionic emulsifier or a nonionic emulsifier is preferred. The anionic emulsifier can include, for instance, sodium alkyl benzene sulfonate, sodium alkyl diphenyl ether disulfonate, sodium alkyl sulfate, sodium polyoxyethylene alkyl sulfate, or sodium polyoxyethylene nonylphenyl ether sulfate.

The nonionic emulsifier can include, for instance, the following. Polyoxyethylene alkyl ether, polyoxyethylene alkylene alkylether, polyoxyethylene distyrenated phenyl ether, polyoxyethylene tribenzylphenyl ether, polyoxyethylene polyoxypropylene glycol . . . etc.

These emulsifiers can be used alone or in a combination of two or more.

Based on 100 parts by mass of the organosiloxane mixture, the usage amount of the emulsifier is preferably 0.05 parts by mass to 10 parts by mass, more preferably 0.1 parts by mass to 5 parts by mass. The particle size of the polyorganosiloxane latex can be adjusted to the desired value via the usage amount of the emulsifier. If the usage amount of the emulsifier is 0.05 parts by mass or more, then the emulsion stability of the emulsion of the organosiloxane mixture is sufficient. If the amount of the emulsifier is 10 parts by mass or less, then the amount of the emulsifier remaining in the powder of the graft copolymer can be sufficiently reduced. Therefore, degradation of thermal decomposition resistance and surface appearance of the resin composition containing the graft copolymer and the resin can be inhibited.

The acid catalyst used in the polymerization of the organosiloxane mixture can include, for instance, sulfonic acid such as aliphatic sulfonic acid, aliphatic-substituted benzenesulfonic acid, or aliphatic-substituted naphthalene sulfonic acid, or an inorganic acid such as sulfuric acid, hydrochloric acid, or nitric acid. These acid catalysts can be used alone or in a combination of two or more. Among these, if an inorganic acid such as sulfuric acid, hydrochloric acid, or nitric acid is used, then the particle size distribution of the polyorganosiloxane latex can be narrowed. As a result, inhibition of reduction in thermal decomposition resistance and poor appearance of the molded product caused by the emulsifier component in the polyorganosiloxane latex can be achieved.

Based on 100 parts by mass of the organosiloxane, the usage amount of the acid catalyst is preferably 0.005 parts by mass to 5 parts by mass. If the usage amount of the acid catalyst is 0.005 parts by mass, then the polyorganosiloxane can be polymerized in a short period of time. Moreover, if the usage amount of the acid catalyst is 5 parts by mass or less, then a molded product having good thermal decomposition resistance and appearance can be obtained.

Moreover, since the usage amount of the acid catalyst is a determining factor of the particle size of polyorganosiloxane, to obtain the polyorganosiloxane having the later-described particle size, the usage amount of the acid catalyst is preferably set to 0.005 parts by mass to 1.5 parts by mass.

The mass-average particle size of the polyorganosiloxane latex is preferably in the range of 250 nm to 1000 nm. By setting the mass-average particle size of the polyorganosiloxane latex in the range of 250 nm to 1000 nm, the volume-average particle size of the rubber (A) can be adjusted to the range of 300 nm to 2000 nm.

The "mass-average particle size/number-average particle size (Dw/Dn)" of the polyorganosiloxane latex is preferably in the range of 1.0 to 1.7. By setting Dw/Dn in the range of 1.0 to 1.7, a graft copolymer having high pigment colorability can be obtained.

The values of Dw and Dn can adopt values measured via the following method. A product formed by diluting the polyorganosiloxane latex to a concentration of about 3% via deionized water is used as the sample, and the particle size is measured using a CHDF2000-type particle size distribution meter made by Matec Corporation. The particle size adopts a median diameter as the average particle size.

The measurement can be performed under the following standard conditions recommended by Matec Corporation.

Cartridge: dedicated capillary-type cartridge for particle separation (trade name: C-202), carrier fluid: dedicated carrier fluid (trade name: 2XGR500), liquid properties of carrier fluid: substantially neutral, flow velocity of carrier fluid: 1.4 ml/min, pressure of carrier fluid: about 4,000 psi (pounds per square inch) (2,600 kPa), measured temperature: 35° C., sample usage amount: 0.1 ml.

Moreover, the standard particle substance adopts monodispersed polyethylene made by Duke Corporation for which the particle size is known, and 12 types of particles for which the particle size is in the range of 40 nm to 800 nm.

In the polyorganosiloxane latex obtained via the above method, an emulsifier can also be added as needed for the purpose of increasing mechanical stability. The emulsifier is preferably the same anionic emulsifier or nonionic emulsifier exemplified above.

[Vinyl Polymer (A2)]

The vinyl polymer (A2) of the invention can include, for instance, a polymer obtained by polymerizing the vinyl monomer (a2) for rubber.

[Vinyl Monomer (a2) for Rubber]

Specific examples of the vinyl monomer (a2) for rubber can include, for instance, the following monomers. An aromatic vinyl monomer such as styrene, α-methyl styrene, or vinyltoluene; an alkyl methacrylate such as methyl methacrylate, ethyl methacrylate, n-butyl methacrylate, or isobutyl methacrylate; an alkyl acrylate such as ethyl acrylate, n-propyl acrylate, n-butyl acrylate, isobutyl acrylate, or 2-ethylhexyl acrylate; aryl (meth)acrylate for which the ester group is a phenyl group or a substituent phenyl group such as phenyl (meth)acrylate, 4-t-butylphenyl (meth)acrylate, bromophenyl (meth)acrylate, dibromophenyl (meth)acrylate, 2,4,6-tribromophenyl (meth)acrylate, monochlorophenyl (meth)acrylate, dichlorophenyl (meth)acrylate, or trichlorophenyl (meth)acrylate; a vinyl cyanide monomer such as acrylonitrile or methacrylonitrile . . . etc. These can be used alone or in a combination of two or more.

Among these, in terms of adjusting the index of refraction of the rubber (A) to the range of 1.47 to 1.56, the vinyl monomer (a2) for rubber preferably adopts an aromatic vinyl monomer and/or aryl (meth)acrylate for which the ester group is a phenyl group or a substituent phenyl group. That is, the vinyl polymer (A2) is preferably a polymer containing an aromatic vinyl monomer unit and/or aryl (meth)acrylate unit for which the ester group is a phenyl group or a substituent phenyl group. In 100 mass % of the rubber (A), the content of the vinyl polymer (A2) is preferably 15 mass % to 90 mass %, more preferably 20 mass % to 60 mass %, and still more preferably 45 mass % to 60 mass %.

The vinyl monomer (a2) for rubber preferably contains a crosslinking monomer. The crosslinking monomer can include, for instance, the following polyfunctional monomers. Allyl methacrylate, triallyl cyanurate, trially isocyanurate, divinylbenzene, ethylene glycol dimethacrylate, propylene glycol dimethacrylate, 1,3-butylene glycol dimethacrylate, 1,4-butylene glycol dimethacrylate, 1,6-hexanediol diacrylate, 1,2,4-triallyl trimellitate . . . etc. These can be used alone or in a combination of two or more.

In 100 mass % of the vinyl monomer (a2) for rubber, the content of the crosslinking monomer is preferably 0.1 mass % to 10 mass %, more preferably 0.1 mass % to 5 mass %, still more preferably 0.3 mass % to 5 mass %, and still yet more preferably 0.3 mass % to 3 mass %. If the content of the crosslinking monomer is 0.1 mass % or more and 10 mass % or less, then the low-temperature impact resistance of the graft copolymer is increased, which is preferred.

The manufacturing method of the vinyl polymer (A2) is not particularly limited, and can include, for instance, an emulsion polymerization method, a suspension polymerization method, or a microsuspension polymerization method, and an emulsion polymerization method is preferred.

The free-radical polymerization initiator used in the polymerization of the vinyl monomer (a2) for rubber can adopt an azo-based initiator, peroxide, and a redox-based initiator formed by the combination of peroxide and a reducing agent. These can be used alone or in a combination of two or more. Among these, an azo-based initiator or a redox-based initiator is preferred.

The azo-based initiator can include, for instance, the following. An oil-soluble azo-based initiator such as 2,2'-azobisisobutyronitrile, dimethyl 2,2'-azobis(2-methyl propionate), 2,2'-azobis(2,4-dimethylvaleronitrile), or 2,2'-azobis(2-methylbutyronitrile), a water-soluble azo-based initiator such as 4,4'-azobis(4-cyanopentanoic acid), 2,2'-azobis[N-(2-carboxymethyl)-2-methylpropionamidine]hydrate, 2,2'-azobis-(N,N'-dimethylene isobutyl amidine)dihydrochloride, or 2,2'-azobis[2-(2-imidazolin-2-yl)propane] dihydrochloride . . . etc. These can be used alone or in a combination of two or more.

The peroxide can include, for instance, the following. Inorganic peroxide such as hydroperoxide, potassium persulfate, or ammonium persulfate, or organic peroxide such as diisopropyl benzene hydroperoxide, p-menthane hydroperoxide, cumene hydroperoxide, t-butyl hydroperoxide, succinic acid peroxide, t-butyl peroxy neodecanoate, t-butyl peroxyneoheptanoate, t-butyl peroxy trimethylacetate, 1,1,3,3-tetramethylbutyl peroxy-2-ethylhexanoate, or t-butyl peroxy-2-ethylhexanoate. These can be used alone or in a combination of two or more.

When the redox-based initiator is formed by the combination of peroxide and a reducing agent, the above peroxide and a reducing agent such as sodium formaldehyde sulfoxylate, L-ascorbic acid, fructose, dextrose, sorbose, or inositol are preferably combined with ferrous sulfate-ethylenediaminetetraacetic acid disodium salt. These reducing agents can be used alone or in a combination of two or more.

The free-radical polymerization initiator used in the polymerization of the vinyl monomer (a2) for rubber preferably has a solubility of 5 mass % or less for water at 20° C., preferably 2 mass % or less. By using the free-radical polymerization initiator to perform polymerization, a graft copolymer having excellent low-temperature impact resistance can be obtained.

The free-radical polymerization initiator having a solubility of 5 mass % or less for water at 20° C. can include, for instance, the following. Cumene hydroperoxide, diisopropyl benzene hydroperoxide, p-menthane hydroperoxide, t-butyl peroxy neodecanoate, t-butyl peroxyneoheptanoate, t-butyl peroxytrimethylacetate, 1,1,3,3-tetramethylbutyl peroxy-2-ethylhexanoate, t-butyl peroxy-2-ethylhexanoate, 2,2'-azobisisobutyronitrile, dimethyl 2,2'-azobis(2-methylpropionate), 2,2'-azobis(2,4-dimethylvaleronitrile), 2,2'-azobis(2-methylbutyronitrile) . . . etc. These can be used alone or in a combination of two or more.

The solubility of the free-radical polymerization initiator for water at 20° C. can be obtained from, for instance, a catalog of various free-radical polymerization initiators.

Regarding the usage amount of the free-radical polymerization initiator, when an azo-based initiator is used, 0.01 parts by mass to 1 part by mass is preferred based on a total of 100 parts by mass of the monomer. In the case of a redox-based initiator, based on a total of 100 parts by mass of the monomer, the usage amount of the peroxide is preferably 0.01 parts by mass to 1 part by mass. Based on a total of 100 parts by mass of the monomer, the usage amount of the reducing agent is preferably 0.01 parts by mass to 1 part by mass.

[Rubber (A)]

The rubber (A) of the invention contains the polyorganosiloxane (A1) and the vinyl polymer (A2). The rubber (A) can include, for instance, rubbers having the structures of (1) to (3) below.

(1) a rubber having a multilayer structure and having a structure in which the core of the polyorganosiloxane (A1) is covered by the shell of the vinyl polymer (A2), (2) a rubber having a multilayer structure and having a structure in which the core of the vinyl polymer (A2) is covered by the shell of the polyorganosiloxane (A1), (3) a composite rubber containing the polyorganosiloxane (A1) and the vinyl polymer (A2).

The rubber (A) is preferably a "composite rubber" containing the polyorganosiloxane (A1) and the vinyl polymer (A2). The low-temperature impact resistance of the graft copolymer obtained from the composite rubber is good. The rubber (A) is more preferably the "composite rubber" composed of the polyorganosiloxane (A1) and the vinyl polymer (A2).

In the invention, the index of refraction of the rubber (A) is in the range of 1.47 to 1.56, preferably in the range of 1.47 to 1.54, more preferably in the range of 1.47 to 1.53, and still more preferably in the range of 1.49 to 1.52. By setting the index of refraction of the rubber (A) in the range of 1.47 to 1.56, a resin composition having excellent pigment colorability and low-temperature impact resistance can be obtained. If the index of refraction of the rubber (A) is 1.47 or more, then the pigment colorability of the resin composition is good, which is preferred. Moreover, if the index of refraction of the rubber (A) is 1.56 or less, then the low-temperature impact resistance of the resin composition is good, which is preferred. The adjustment of the index of refraction of the rubber (A) can be performed via the adjustment of the content of the polyorganosiloxane and the type and the usage amount of the vinyl monomer (a2) for rubber in the rubber (A).

The index of refraction of the rubber (A) is calculated via the following (equation 1) recited in POLYMER HANDBOOK 4th Edition (published by Wiley Interscience).

$$n = v1n1 + v2n2 + v3n3 +$$  <Equation 1>

Moreover, "n1, n2, n3, . . . " in the equation represent the index of refraction of the homopolymer of each monomer at 20° C., and values recited in POLYMER HANDBOOK 4th Edition can be used. In the equation, "v1, v2, v3, . . . " represent the volume fraction of each monomer.

In the rubber (A) of the invention, preferably, the content of the polyorganosiloxane (A1) is 40 mass % to 80 mass %, the content of the vinyl polymer (A2) is 60 mass % to 20 mass %, more preferably, the content of the polyorganosiloxane (A1) is 40 mass % to 55 mass %, and the content of the vinyl polymer (A2) is 60 mass % to 45 mass %. By setting the content of the polyorganosiloxane (A1) to 40 mass % to 80 mass % and the content of the vinyl polymer (A2) to 60 mass % to 20 mass %, the balance among low-temperature impact resistance, pigment colorability, and flame retardance of the resin composition of the graft copolymer is good.

Based on a total of 100 mass % of the rubber (A), the content of the alkyl (meth)acrylate unit in the rubber (A) is preferably 0 mass % to 35 mass %, more preferably 0 mass % to 30 mass %, still more preferably 0 mass % to 20 mass %, and still yet more preferably 0 mass % to 15 mass %. By setting the content of the alkyl (meth)acrylate unit to 0 mass % to 35 mass %, the balance among low-temperature impact resistance, pigment colorability, and flame retardance of the resin composition of the graft copolymer is good.

The manufacturing method of the rubber (A) is not particularly limited. The manufacturing method of the rubbers having the structures of (1) to (3) can include the following methods.

Rubber having the structure of (1): a method in which the latex of the rubber (A) is obtained by polymerizing the vinyl monomer (a2) for rubber in the presence of polyorganosiloxane latex;

rubber having the structure of (2): a method in which the latex of the rubber (A) is obtained by polymerizing an organosilane mixture in the presence of the latex of the vinyl polymer (A2);

rubber having the structure of (3):

[3-1] a method in which the vinyl monomer (a2) for rubber is added in the polyorganosiloxane latex such that the vinyl monomer (a2) for rubber is polymerized after the vinyl monomer (a2) for rubber is immersed in polyorganosiloxane particles to obtain the latex of the rubber (A); and

[3-2] a method in which an organosiloxane mixture is added in the latex of the vinyl polymer (A2) such that the organosiloxane is polymerized after the organosiloxane mixture is immersed in the vinyl polymer (A2) particles to obtain the latex of the rubber (A).

In terms of readily adjustment of particle size, the method of obtaining the composite rubber having the structure of (3) preferably is the method of [3-1].

The method of [3-1] includes first adding the vinyl monomer (a2) for rubber in the polyorganosiloxane latex, and then performing polymerization using a known free-radical polymerization initiator after the vinyl monomer (a2) for rubber is immersed in the polyorganosiloxane. In the method, the addition method of the vinyl monomer (a2) for rubber can include, for instance, a method in which the entire amount of the vinyl monomer (a2) for rubber is added in the polyorganosiloxane latex, or the vinyl monomer (a2) for rubber is added dropwise at a certain speed.

During the manufacture of the latex of the rubber (A), to stabilize the latex and to control the particle size of the rubber (A), an emulsifier can be added. The emulsifier can include, for instance, the same emulsifier used in the manufacture of the polyorganosiloxane latex, and an anionic emulsifier and a nonionic emulsifier are preferred.

The volume-average particle size (Dv) of the rubber (A) is in the range of 300 nm to 2000 nm. If the volume-average particle size of the rubber (A) is 300 nm or more, then low-temperature impact resistance and pigment colorability of the resin composition containing a graft copolymer are good, which is preferred. Moreover, if the volume-average particle size is 2000 nm or less, then the surface appearance and the low-temperature impact resistance of the molded product are good, which is preferred. In terms of good balance between low-temperature impact resistance and pigment colorability of the resin composition, the volume-average particle size of the rubber (A) is preferably in the range of 300 nm to 1000 nm, more preferably in the range of 400 nm to 1000 nm.

The volume-average particle size/number-average particle size (Dv/Dn) of the rubber (A) is preferably in the range of 1.0 to 2.0, more preferably in the range of 1.0 to 1.5. Dv/Dn represents particle size distribution, and monodispersibility is higher the closer the value is to 1.0. If Dv/Dn is 2.0 or less, then the pigment colorability of the resin composition is good, which is preferred. Moreover, the measurement method of Dv/Dn is described in the examples later.

[Grafting Vinyl Monomer (b)]

The grafting vinyl monomer (b) is polymerized in the presence of the rubber (A), a grafting portion containing a vinyl polymer is formed for the rubber (A), and a polyorganosiloxane-containing graft copolymer can thus be obtained.

The grafting vinyl monomer (b) can include, for instance, the following. An aromatic vinyl monomer such as styrene, α-methyl styrene, or vinyltoluene; an alkyl methacrylate such as methyl methacrylate, ethyl methacrylate, n-butyl methacrylate, or isobutyl methacrylate; alkyl acrylate such as ethyl acrylate, n-butyl acrylate, or methyl acrylate; a vinyl cyanide monomer such as acrylonitrile or methacrylonitrile; aryl (meth)acrylate for which the ester group is a phenyl group or a substituent phenyl group such as phenyl (meth) acrylate, 4-t-butylphenyl (meth)acrylate, bromophenyl (meth)acrylate, dibromophenyl (meth)acrylate, 2,4,6-tribromophenyl (meth)acrylate, monochlorophenyl (meth)acrylate, dichlorophenyl (meth)acrylate, or trichlorophenyl (meth)acrylate . . . etc. These can be used alone or in a combination of two or more.

The grafting vinyl monomer (b) can also contain a crosslinking monomer, and in that case, the usage amount of the crosslinking monomer in 100 mass % of the grafting vinyl monomer (b) is preferably 0.005 mass % or less.

In terms of further increasing the pigment colorability of the resin composition, the index of refraction of the "polymer" obtained in the individual polymerization of the grafting vinyl monomer (b) is preferably in the range of 1.50 to 1.60. By setting the index of refraction of the polymer in the range of 1.50 to 1.60, the low-temperature impact resistance and the pigment colorability of the resin composition can be further increased. The index of refraction of the polymer is preferably in the range of 1.52 to 1.59.

The index of refraction of the polymer is calculated using the same equation as for the index of refraction of the rubber (A) above. The type and the usage amount of the grafting vinyl monomer (b) are adjusted to set the index of refraction of the polymer in the range of 1.50 to 1.60.

In terms of adjusting the index of refraction of the polymer to the range of 1.50 to 1.60, the grafting vinyl monomer (b) preferably contains at least one selected from the group consisting of an aromatic vinyl monomer, alkyl (meth)acrylate, vinyl cyanide monomer, and aryl (meth) acrylate for which the ester group is a phenyl group or a substituent phenyl group. Moreover, in terms of the miscibility of the graft copolymer and the thermoplastic resin, containing aryl (meth)acrylate for which the ester group is a phenyl group or a substituent phenyl group is preferred.

Based on 100 mass % of the grafting vinyl monomer, the content of the monomer in the grafting vinyl monomer (b) and selected from one or more of an aromatic vinyl monomer, alkyl (meth)acrylate, vinyl cyanide monomer, and aryl (meth)acrylate for which the ester group is a phenyl group or a substituent phenyl group is preferably 5 mass % to 100 mass %, more preferably 20 mass % to 100 mass %, and still more preferably 50 mass % to 100 mass %.

Based on 100 mass % of the graft copolymer, the content of the rubber (A) in the graft copolymer is preferably 10 mass % to 99 mass %. If the content of the rubber (A) is 10 mass % or more, then the low-temperature impact strength of the resin composition is sufficient, and if the content of the rubber (A) is 99 mass % or less, then the surface appearance of the molded product is good, which is preferred. In terms of better low-temperature impact strength of the resin composition, based on 100 mass % of the graft copolymer, the content of the rubber (A) is preferably 50 mass % to 95 mass %, more preferably 65 mass % to 90 mass %.

The method of graft copolymerization can include, for instance, a method in which the grafting vinyl monomer (b) is added in the latex of the rubber (A) to perform polymerization in one stage or multiple stages. In the case of polymerization in multiple stages, preferably, polymerization is performed by dividing the entire usage amount of the grafting vinyl monomer (b) and adding the grafting vinyl monomer (b) in batches or continuously in the presence of the latex of the rubber (A). The polymerization stability of the polymerization method is good, and a latex having the desired particle size and particle size distribution can be obtained in a stable manner.

Regarding the latex of the rubber (A) obtained by the method of [3-1], preferably, polymerization is performed by dividing the entire usage amount of the grafting vinyl monomer (b) and adding the grafting vinyl monomer (b) in batches or continuously.

During the polymerization of the graft portion, an emulsifier can be further added as needed. The emulsifier for the polymerization of the graft portion can include, for instance, the same emulsifier used in the manufacture of the rubber (A), and an anionic emulsifier and a nonionic emulsifier are preferred.

The polymerization initiator for the polymerization of the graft portion can include, for instance, the same polymerization initiator used in the manufacture of the rubber (A), and an azo-based initiator and a redox-based initiator are preferred.

When the powder of the graft copolymer is recycled from the latex of the graft copolymer, any method of a spray drying method and a coagulation method can be used.

The spray drying method is a method in which the latex of the graft copolymer is sprayed in the form of fine droplets in a dryer to perform drying by bringing a heating gas for drying in contact with the latex of the graft copolymer. The method of generating the fine droplets can include, for instance, a rotating disk, a pressure nozzle, a dual fluid nozzle, or a pressurized dual fluid nozzle. The capacity of the dryer can be any of the small capacity used in laboratories to the large capacity used in industries. The temperature of the heating gas for drying is preferably 200° C. or less, more preferably 120° C. to 180° C. Alternatively, the latexes of 2 or more graft copolymers respectively manufactured can also be spray dried together. Moreover, for the blocking during spray drying and for increasing powder characteristics such as bulk specific gravity, any component such as silicon dioxide can also be added in the latex of the graft copolymer to perform spray drying.

The coagulation method is a method in which the latex of the graft copolymer is condensated, and then the graft copolymer is separated and recycled to perform drying. First, the latex of the graft copolymer is put in hot water in which a coagulant is dissolved to perform salting out and to solidify the latex of the graft copolymer, so as to separate the graft copolymer. Then, dehydration . . . etc. is performed on the separated moist graft copolymer to recycle the graft copolymer for which the water amount is reduced. Drying is performed on the recycled graft copolymer using a dehydration press or a hot air dryer.

The coagulant can include inorganic salt such as aluminum chloride, aluminum sulfate, sodium sulfate, magnesium sulfate, sodium nitrate, or calcium acetate, or acid such as sulfuric acid, and calcium acetate is more preferred. These coagulants can be used alone or in a combination of two or more. However, when two or more are used, a combination in which a water-insoluble salt is not formed is preferably selected. For instance, if calcium acetate and sulphuric acid or sodium salt thereof are used together, then water-insoluble calcium salt is formed, which is unsatisfactory.

The coagulant is generally used in the form of an aqueous solution. In terms of coagulating and recycling the graft copolymer in a stable manner, the concentration of the aqueous coagulant solution is preferably 0.1 mass % or more, more preferably 1 mass % or more. Moreover, in terms of reducing the amount of coagulant remaining in the recycled graft copolymer and preventing degradation to the molded appearance of the molded product, the concentration of the aqueous coagulant solution is preferably 20 mass % or less, more preferably 15 mass % or less. The amount of the aqueous coagulant solution is not particularly limited, and is preferably 10 parts by mass or more and 500 parts by mass or less based on 100 parts by mass of the latex.

The method of bringing the latex in contact with the aqueous coagulant solution is not particularly limited, and the following methods can generally be included. (1) A method in which the aqueous coagulant solution is stirred while the latex is continuously added therein and a certain time is held; (2) a method in which the aqueous coagulant solution and the latex are continuously injected into a container provided with a stirrer in a certain ratio to continuously extract a mixture containing condensed polymer and water from the container while the aqueous coagulant solution and the latex are in contact with each other. The temperature when the latex and the aqueous coagulant solution are in contact is not particularly limited, and is preferably 30° C. or more and 100° C. or less. The contact time is not particularly limited.

The condensated graft copolymer is washed with water in about 1 mass to about 100 mass-fold, and the filtered moist graft copolymer is dried using, for instance, a flow dryer or a dehydration press. The drying temperature and the drying time can be suitably decided according to the obtained graft copolymer. Moreover, the graft copolymer discharged from the dehydration press or the extruder can also not be recycled and directly sent to the extruder or the molding machine manufacturing the resin composition, and mixed with the thermoplastic resin to obtain the molded product.

In the invention, in terms of the thermal decomposition resistance of the resin composition obtained by mixing with the thermoplastic resin, a coagulation method is preferably used to recycle the graft copolymer.

[Impact Strength, Pigment Colorability, and Flame Retardance]

The graft copolymer of the invention is preferably the following polymer (sometimes referred to as "graft copolymer 2 of the invention" hereinafter), i.e., "test piece 1", "test piece 2", or "test piece 3" made according to the following "manufacturing conditions" measured for Charpy impact strength [$kJ/m^2$], L*, and flame retardance under the following "measurement conditions" have the following properties described in (1) to (3).

(1) The Charpy impact strength at −30° C. is 20 $kJ/m^2$ or more,
(2) L* is 8 or less,
(3) flame retardance is V1 or V0.

[Manufacturing Conditions of Test Piece 1 and Test Piece 2]:

(a) the polyorganosiloxane-containing graft copolymer is 3 parts by mass, (b) an aromatic polycarbonate resin having a viscosity-average molecular weight of 24,000 (Iupilon S-2000F made by Mitsubishi Engineering-Plastics Corporation) is 97 parts by mass, (c) Irganox 1076 (made by BASF) is 0.1 parts by mass, (d) ADK STAB 2112 (made by ADEKA) is 0.1 parts by mass, (e) carbon black #960 (made by Mitsubishi Chemical Corporation) is 0.1 parts by mass.

The 5 materials (a) to (e) above are prepared, and mixing and extrusion are performed under the condition of a screw rotation speed of 150 rpm via a devolatilizing extruder (PCM-30 made by IKEGAI Ltd.) heated to a roller temperature of 280° C. to obtain particles. The particles are molded via a 100 t injection molding machine (SE-100DU made by Sumitomo Heavy Industries, Ltd.) under the conditions of a barrel temperature of 280° C. and a mold temperature of 90° C. to obtain "test piece 1" (length: 80 mm, width: 10 mm, thickness: 4 mm, with a V-notch) and "test piece 2" (length: 100 mm, width: 50 mm, thickness: 2 mm).

[Manufacturing Conditions of Test Piece 3]:

(a) the polyorganosiloxane-containing graft copolymer is 5 parts by mass, (b) an aromatic polycarbonate resin having a viscosity-average molecular weight of 24,000 (Iupilon S-2000F made by Mitsubishi Engineering-Plastics Corporation) is 89.5 parts by mass, (e) carbon black #960 (made by Mitsubishi Chemical Corporation) is 0.1 parts by mass, (f) an aromatic phosphate-based flame retardant (PX-200 made by Daihachi Chemical Industry Co., Ltd.) is 5 parts by mass, (g) polytetrafluoroethylene-containing powder (Metablen A-3800 made by Mitsubishi Rayon Co., Ltd.) is 0.5 parts by mass.

The 5 materials (a), (b), (e), (f), and (g) above are prepared, and mixing and extrusion are performed under the condition of a screw rotation speed of 150 rpm via a devolatilizing extruder (PCM-30 made by IKEGAI Ltd.) heated to a roller temperature of 280° C. to obtain particles. The particles are molded via a 100 t injection molding machine (SE-100DU made by Sumitomo Heavy Industries, Ltd.) under the conditions of a barrel temperature of 280° C. and a mold temperature of 90° C. to obtain "test piece 3" (length: 127 mm, width: 12.7 mm, thickness: 1.6 mm).

[Measurement Conditions of Charpy Impact Strength]:

The Charpy impact strength is measured for "test piece 1" placed in an environment of −30° C. for 12 hours or more according to the method of ISO 179.

[Measurement Conditions of L*]:

Tristimulus values (XYZ) are measured for "test piece 2" according to the following measurement conditions of JISZ8722. Then, the L* value is calculated using a CIE color difference formula.

Apparatus: spectroscopic colorimeter SE-2000 (made by Nippon Denshoku Industries Co., Ltd., a method of after-sample light splitting of 0° to 45°), measurement range: 380 nm to 780 nm, measurement light source: C light (2° field of view).

[Measurement Conditions of Flame Retardance]:

Flame retardance is measured for "test piece 3" according to UL-94V (vertical test method).

The low-temperature impact resistance, the pigment colorability, and the flame retardance of the thermoplastic resin composition obtained using the "graft copolymer 2 of the invention" satisfying the properties of (1) to (3) shown above are good.

In the properties shown in (1) to (3), the Charpy impact strength at −30° C. is preferably 23 kJ/m$^2$ or more, and L* is preferably 6 or less.

The "graft copolymer 2 of the invention" is preferably the following graft copolymer, i.e., a graft copolymer obtained by polymerizing the grafting vinyl monomer (b) in the presence of the rubber (A) containing the polyorganosiloxane (A1) and the vinyl polymer (A2), wherein the index of refraction of the rubber (A) is in the range of 1.47 to 1.56, and the volume-average particle size of the rubber (A) is in the range of 300 nm to 2000 nm.

Increase in the Charpy impact strength at −30° C. can be achieved via, for instance, the following: setting the volume-average particle size of the rubber (A) in the range of 300 nm to 2000 nm, and increasing the content of the polyorganosiloxane (A1) in the rubber (A).

Reduction in L* can be achieved via, for instance, the following: setting the volume-average particle size of the rubber (A) in the range of 300 nm to 2000 nm and setting the index of refraction of the rubber (A) to 1.47 to 1.56.

A flame retardance property of "V1" or above can be achieved via, for instance, the following: setting the volume-average particle size of the rubber (A) in the range of 300 nm to 2000 nm, and increasing the content of the polyorganosiloxane (A1) in the rubber (A).

<Thermoplastic Resin Composition>

"Graft copolymer 1 of the invention" or "graft copolymer 2 of the invention" can be mixed with a thermoplastic resin as the thermoplastic resin composition.

The thermoplastic resin usable in the invention is not particularly limited, and can include, for instance, one or more resins selected from a thermoplastic resin and a thermoplastic elastomer.

[Thermoplastic Resin]

The thermoplastic resin can include, for instance, the following. An olefin resin such as polypropylene (PP) or polyethylene (PE); a styrene (St)-based resin such as polystyrene (PS), high-impact polystyrene (HIPS), (metha)acrylate styrene copolymer (MS), styrene acrylonitrile copolymer (SAN), styrene maleic anhydride (SMA), acrylonitrile-butadiene-styrene copolymer (ABS), acrylonitrile styrene acrylate copolymer (ASA), or acrylonitrile ethylene propylene-based rubber styrene copolymer (AES); an acrylic (Ac)-based resin such as polymethyl methacrylate (PMMA); a polycarbonate (PC) resin; a polyamide (PA) resin; a polyester (PEs) resin such as polyethylene terephthalate (PET) or polybutylene terephthalate (PBT); an engineering plastic such as a modified polyphenylene ether ((m-)PPE) resin, a polyoxymethylene (POM) resin, a polysulfone (PSO) resin, a polyarylate (PAr) resin, or a polyphenylene sulfide (PPS) resin; a polyurethane (PU) resin; a polyvinyl chloride (PVC)-based resin such as a hard vinyl chloride resin, a semi-hard vinyl chloride resin, or a soft vinyl chloride resin; an alloy of a PC resin and an St-based resin such as PC/ABS; an alloy of a PVC-based resin and an St-based rein such as PVC/ABS; an alloy of a PA resin and an St-based rein such as PA/ABS; an alloy of a PA resin and a thermoplastic elastomer (TPE); an alloy of a PA resin and a polyolefin resin such as PA/PP; an alloy of a PC resin and a PEs resin such as PC/PBT; an alloy between olefin resins such as PP/TPE or PP/PE; an alloy of a PPE-based resin and other resins such as PPE/HIPS, PPE/PBT, or PPE/PA; an alloy of a PVC-based resin and an acrylic-based resin such as PVC/PMMA . . . etc.

The thermoplastic elastomer can include, for instance, the following. A styrene-based elastomer, an olefin-based elastomer, a vinyl chloride-based elastomer, a urethane-based elastomer, a polyester-based elastomer, a polyamide-based elastomer, a fluorine-based elastomer, 1,2-polybutadiene, trans-1,4-polyisoprene . . . etc. Among these, a urethane-based elastomer, a polyester-based elastomer, or a polyamide-based elastomer is preferred.

The thermoplastic resin is preferably selected from the following. An St-based resin, a PC resin, a PA resin, a PET resin, a PBT resin, an (m-)PPE resin, a POM resin, a PU resin, an alloy of a PC resin and an St-based resin such as PC/ABS, an alloy of a PA resin and an St-based resin such as PA/ABS, an alloy of a PA resin and TPE, an alloy of a PA resin and a polyolefin-based resin such as PA/PP, an alloy of a PC resin and a PEs resin such as PC/PBT, an alloy of a PPE-based resin and other resins such as PPE/PBT or PPE/PA . . . etc.

Specifically, among the above resins, in term of maximizing the improving effect of pigment colorability, a polycarbonate resin is preferred, and an aromatic polycarbonate resin is more preferred.

The aromatic polycarbonate resin is a branchable thermoplastic aromatic polycarbonate polymer or copolymer obtained by reacting an aromatic hydroxyl compound or an aromatic hydroxyl compound and a small amount of a polyhydroxyl compound with phosgene or a diester of carbonic acid. The manufacturing method of the aromatic polycarbonate resin is not particularly limited, and a known method can be used, such as a phosgene method (interfacial polymerization method) or a melting method (transesterification method). In the invention, an aromatic polycarbonate resin made by a melting method and for which the amount of terminal OH groups is adjusted can also be used.

The aromatic polycarbonate resin can include, for instance, the following. Iupilon S-1000, Iupilon S-2000, Iupilon S-3000, Iupilon H-3000, or Iupilon H-4000 (made by Mitsubishi Engineering Plastics Co., Ltd.), or Panlite L1250, Panlite L1225, or Panlite K1300 (made by Teijin Chemicals Ltd.) . . . etc.

In a total of 100 mass % of the thermoplastic resin and the graft copolymer, the content of the graft copolymer is preferably 0.5 mass % to 90 mass %, more preferably 0.5 mass % to 20 mass %. If the content of the graft copolymer is 0.5 mass % or more, then a resin composition having excellent impact resistance can be obtained, if the content of the graft copolymer is 20 mass % or less, then a resin composition having excellent surface appearance can be obtained, and if the content of the graft copolymer is 0.5 mass % to 20 mass %, then a resin composition having excellent impact resistance and surface appearance can be obtained.

[Additive]

Without departing from the object of the invention, the thermoplastic resin composition can contain various additives. The additive can include, for instance: a stabilizer such as a phenol-based stabilizer, a phosphorus-based stabilizer, a UV absorber, or an amine-based light stabilizer; a flame retardant that is, for instance, phosphorus-based, bromine-based, silicone-based, or organic metal salt-based; a modifier for providing various physical properties such as hydrolysis resistance; a filler agent such as titanium dioxide or talc; a dye/pigment; a plasticizer.

When the thermoplastic resin is an aromatic polycarbonate resin, the additive can adopt the following. A flame retardant process agent, an anti-drip liquid agent (such as fluorinated polyolefin, silicone, and aramid fiber), a lubricant, a mold-release agent (such as pentaerythrityl tetrastearate), a nucleating agent, an antistatic agent, a stabilizer, a filling material, a reinforcing agent (such as glass fiber, carbon fiber, mica, kaolin, talc, calcium carbonate ($CaCO_3$), and glass flakes), colorant, and pigment. These can be used alone or in a combination of two or more.

[Preparation Method of Resin Composition]

The preparation method of the thermoplastic resin composition of the invention is not particularly limited, and can include mixing and dispersing a graft copolymer, a thermoplastic resin composition, and various optional additives via, for instance, a V-type blender or a Henschel mixer, and performing melt kneading on the mixture using, for instance, an extruder, a Banbury mixer, a pressure kneader, or a roller. The mixing of each of the components can be implemented in batches or continuously, and the mixing order of each of the components is not particularly limited. The melt-kneaded product can be made into a particle and used in various molding.

<Molded Product>

The molding method of the thermoplastic resin composition can include, for instance: a method of molding a thermoplastic resin composition or a mixture of a graft copolymer powder and a thermoplastic resin via an injection molding machine.

The application of the molded product is not particularly limited, and can be extensively used in industries as a material in, for instance, the automotive field, the OA equipment field, or the electrical/electronic field.

EXAMPLES

In the following, the invention is specifically described via examples and comparative examples. Before the examples, the various evaluation methods and manufacture example 1 to manufacture example 3 of the latex of the polyorganosiloxane are described. Example 1 to example 8 and comparative example 1 to comparative example 4 are related to the manufacture and the evaluation of the graft copolymer, and example 9 to example 24 and comparative example 5 to comparative example 14 are related to the manufacture and the evaluation of the thermoplastic resin composition. In the manufacture examples and the examples, "parts" and "%" refer to "parts by mass" and "mass %" unless otherwise specified.

<Evaluation Methods>

(1) Solid Content

The latex of the polyorganosiloxane having a mass of $w_1$ was dried by a hot air dryer at 180° C. for 30 minutes to measure the mass $w_2$ of residue after drying, and the solid content [%] was calculated via the following equation.

Solid content [%] $=w_2/w_1\times 100$ (2) Volume-Average Particle Size, Number-Average Particle Size, Dv/Dn "Rubber latex" or "graft copolymer latex" was diluted using deionized water, then the volume-average particle size Dv and the number-average particle size Dn of the rubber particles and the graft copolymer particles were measured using a laser diffraction/scattering particle size distribution measuring device (SALD-7100 made by Shimadzu Corp.), and then Dv/Dn was calculated.

In the above measurement, the index of refraction was calculated using the monomer composition of the rubber (A) or the graft copolymer. The above particle size adopts a median diameter. Moreover, suitable adjustment was performed on the sample concentration of the rubber latex to obtain a suitable range in the scattering intensity monitor attached to the device.

(3) Charpy Impact Strength

The Charpy impact strength of each of the test pieces (length: 80.0 mmx, width: 10.0 mmx, thickness: 4 mm, with V-notch) was measured at temperatures of 23° C. and −30° C. according to JIS K 7111.

(4) Pigment Colorability

Tristimulus values (XYZ) of the test pieces having a thickness of 2 mm for which coloring was performed using carbon black were measured according to the following measurement conditions of JISZ8722. Then, the L* value was calculated using a CIE color difference formula.

Apparatus: spectroscopic colorimeter SE-2000 (made by Nippon Denshoku Industries Co., Ltd., a method of after-sample light splitting of 0° to 45°), measurement range: 380 nm to 780 nm, measurement light source: C light (2° field of view).

(5) Flame Retardance

A UL-94V test (vertical test method) was performed on ¹⁄₁₆-in. test pieces (length: 127 mm, width: 12.7 mm, thickness: 1.6 mm).

Preparation Example 1

2 parts of tetraethoxysilane (TEOS), 2 parts of γ-methacryloyloxy propyl dimethoxy methyl silane (DSMA), and 96 parts of octamethylcyclotetrasiloxane (made by Momentive Performance Materials Japan Inc., trade name: TSF404) were mixed to obtain 100 parts of an organosiloxane mixture. An aqueous solution formed by dissolving 1 part of sodium dodecylbenzene sulfonate (DBSNa) in 150 parts of deionized water was added in the mixture, and a stable preparatory mixed emulsion was obtained by stirring using a homomixer at 10,000 rpm for 5 minutes and then passing the mixture through a homogenizer at a pressure of 20 MPa twice.

Then, after the above emulsion was added in a separable flask having a volume of 5 L and provided with a cooled condenser, the emulsion was heated to a temperature of 80° C., and then a mixture of 0.20 parts of sulfuric acid and 49.8 parts of distilled water was continuously added over 3 minutes. After the temperature was kept at 80° C. for 7 hours to perform polymerization reaction, the mixture was cooled to room temperature (25° C.), and the resulting reactant was kept at room temperature for 6 hours. Then, a 5% aqueous solution of sodium hydroxide was added to neutralize the reaction solution to a pH of 7.0 to obtain a polyorganosiloxane latex ($A_s$-1).

The solid content of the polyorganosiloxane latex ($A_s$-1) is 29.8%. Moreover, the number-average particle size (Dn) of the latex obtained using a capillary particle size distribution meter is 384 nm, the mass-average particle size (Dw) thereof is 403 nm, and Dw/Dn is 1.05.

Preparation Example 2

2 parts of DSMA, 73 parts of octamethylcyclotetrasiloxane (trade name: TSF404), and 25 parts of diphenyl diethoxy silane (made by Shin-Etsu Silicone Co., Ltd., trade name: LS-5300) were mixed to obtain 100 parts of an organosiloxane mixture. Then, an aqueous solution formed by dissolving 1 part of each of DBSNa and dodecylbenzene sulfonic acid (DBSH) in 200 parts of deionized water was added in the mixture, and a stable preparatory mixed emulsion was obtained by stirring using a homomixer at 10,000 rpm for 5 minutes and then passing the mixture in a homogenizer at a pressure of 20 MPa twice.

Then, after the above emulsion was added in a separable flask having a volume of 5 L and provided with a cooled condenser, the emulsion was heated to a temperature of 80° C., and after the temperature was held for 7 hours to perform a polymerization reaction, the emulsion was cooled to room temperature (25° C.), and the reactant obtained at room temperature was left to stand for 6 hours. Then, a 5% aqueous solution of sodium hydroxide was added to neutralize the reaction solution to a pH of 7.0 to obtain a polyorganosiloxane latex ($A_s$-2).

The solid content of the polyorganosiloxane latex ($A_s$-2) is 28.5%. Moreover, the number-average particle size (Dn) of the latex obtained using a capillary particle size distribution meter is 190 nm, the mass-average particle size (Dw) thereof is 90 nm, and Dw/Dn is 2.11.

Preparation Example 3

2 parts of TEOS, 2 parts of DSMA, and 96 parts of octamethylcyclotetrasiloxane (trade name: TSF404) were mixed to obtain 100 parts of an organic siloxane mixture. An aqueous solution formed by dissolving 0.68 part of DBSNa in 300 parts of deionized water was added in the mixture, and a stable preparatory mixed emulsion was obtained by stirring using a homomixer at 10,000 rpm for 2 minutes and then passing the mixture in a homogenizer at a pressure of 20 MPa twice.

Moreover, 0.3 parts of DBSH, 1.57 parts of sulfuric acid, and 90 parts of deionized water were injected in a separable flask having a volume of 5 L and provided with a cooled condenser to prepare an acid catalyst solution.

The preparatory mixed emulsion was continuously added dropwise in the solution over 8 hours with the acid catalyst solution kept at 90° C. to perform a polymerization reaction. After the dropwise addition was complete, the temperature of the reaction solution was maintained for 2 hours and then the reaction solution was cooled to room temperature (25° C.). Then, the reactant was kept at room temperature for 6 hours. Then, a 5% aqueous solution of sodium hydroxide was added to neutralize the reaction solution to a pH of 7.0 to obtain a polyorganosiloxane latex ($A_s$-3). The solid content of the polyorganosiloxane latex ($A_s$-3) is 18.0%. Moreover, Dn of the latex obtained using a capillary particle size distribution meter is 210 nm, Dw thereof is 150 nm, and Dw/Dn is 1.40.

Example 1

100.67 parts (30.0 parts in polymer equivalents) of the polyorganosiloxane latex ($A_s$-1) obtained in manufacture example 1 was placed in a separable flask having a volume of 5 L, and then 160 parts of deionized water was added to mix. Then, a mixture of 39 parts of styrene (St), 1.0 part of allyl methacrylate (AMA), and 0.16 parts of cumene hydroperoxide (CHP) was added in the separable flask, and then the mixture was continuously stirred at room temperature for 1 hour to immerse the mixture in polyorganosiloxane. Moreover, the mixture is a mixture of the vinyl monomer (a2) for rubber for the raw material of the vinyl polymer (A2).

Nitrogen gas substitution was performed on the atmosphere in the separable flask by streaming nitrogen gas through the flask until the liquid temperature was increased to 50° C. An aqueous solution formed by dissolving 0.001 parts of ferrous (Fe) sulfate, 0.003 parts of ethylenediamine tetraacetic acid disodium salt (EDTA), and 0.24 parts of sodium formaldehyde sulfoxylate (SFS) in 10 parts of deionized water was added at the time point at which the liquid temperature was 50° C. to begin free-radical polymerization. To complete the polymerization of the vinyl monomer component, the state of 65° C. was kept for 1 hour from the time point at which the liquid temperature was reduced to 65° C. to obtain the latex of a rubber (A-1) containing polyorganosiloxane and styrene. The evaluation results of the latex show that the index of refraction of the rubber (A-1) is 1.515, the volume-average particle size (Dv) thereof is 433 nm, and Dv/Dn is 1.16.

A mixture solution of 28.5 parts of methyl methacrylate (MMA), 1.5 parts of methacrylate (MA), and 0.16 parts of t-butyl hydroperoxide (t-BH) was added dropwise in the flask over 1 hour in a state in which the liquid temperature of the latex was 65° C. to begin and maintain the graft polymerization reaction. After the dropwise addition was complete, the state of a temperature of 60° C. or greater was kept for 1 hour and then the mixture was cooled to room temperature to obtain the latex of a polyorganosiloxane-containing graft copolymer (G-1). The index of refraction of the graft portion is 1.489. The volume-average particle size (Dv) of the graft copolymer particles is 525 nm.

Then, 500 parts of an aqueous solution for which the concentration of calcium acetate is 1 mass % was heated to 60° C., and then 340 parts of the latex of the graft copolymer (G-1) was slowly added dropwise in the aqueous solution while stirring to solidify the mixture. After filtering, washing, and dehydration were performed on the resulting graft copolymer (G-1), the graft copolymer (G-1) was dried to obtain the powder of the graft copolymer (G-1).

Example 2 to Example 7, Comparative Example 1 to Comparative Example 3

In example 1, the type and the amount of each raw material used were changed to the conditions shown in Table 1. In addition, the latex of each of a rubber (A-2) to a rubber (A-7) and the latex of each of a rubber (A-9) to a rubber (A-11), a polyorganosiloxane-containing graft copolymer (G-2) to a polyorganosiloxane-containing graft copolymer (G-7), and a polyorganosiloxane-containing graft copolymer (G-9) to a polyorganosiloxane-containing graft copolymer (G-11) were respectively made similarly to example 1 to obtain powders of the graft copolymers. Evaluation of each of the rubbers and each of the graft copolymers was performed similarly to example 1 and the results are shown in Table 1.

Example 8

100.67 parts (30.0 parts in polymer equivalents) of the polyorganosiloxane latex ($A_s$-1) obtained in manufacture example 1 was placed in a separable flask, and after 160 parts of deionized water was added to mix, a mixture of 39 parts of St and 1.0 part of AMA was added. Then, the mixture was stirred at room temperature for 1 hour to immerse the mixture in polyorganosiloxane.

Nitrogen gas substitution was performed on the atmosphere in the separable flask by streaming nitrogen gas through the flask until the liquid temperature was increased to 50° C. An aqueous solution formed by dissolving 0.2 parts of potassium persulfate (KPS) in 10 parts of deionized water was added at a time point at which the liquid temperature was 50° C. to begin free-radical polymerization. To complete the polymerization of the vinyl monomer (a2) component for rubber, the state of 65° C. was kept for 1 hour from the time point at which the liquid temperature was reduced to 65° C. to obtain the latex of a rubber (A-8) containing polyorganosiloxane and styrene.

A mixture solution of 28.5 parts of methyl methacrylate (MMA) and 1.5 parts of methacrylate (MA) was added dropwise over 1 hour in a state in which the liquid temperature of the latex was 65° C. to begin and maintain the graft polymerization reaction. After the dropwise addition was complete, the state of a temperature of 60° C. or greater was kept for 1 hour and then the mixture was cooled to room temperature to obtain the latex of a polyorganosiloxane-containing graft copolymer (G-8).

Then, 500 parts of an aqueous solution for which the concentration of calcium acetate is 1 mass % was heated to 60° C., and then 340 parts of the latex of the graft copolymer (G-8) was slowly added dropwise in the aqueous solution while stirring to solidify the mixture. After filtering, washing, and dehydration were performed on the resulting graft copolymer (G-8), the graft copolymer (G-8) was dried to obtain the powder of the graft copolymer (G-8). Evaluation of the rubber and the graft copolymer was performed similarly to example 1 and the results are shown in Table 1.

Comparative Example 4

In example 8, the type and the amount of each raw material used were changed to the conditions shown in Table 1. In addition, the latex of a rubber (A-12) and a polyorganosiloxane-containing graft copolymer (G-12) were made similarly to example 8 to obtain the powder of the graft copolymer. Evaluation of the rubber and the graft copolymer was performed similarly to example 1 and the results are shown in Table 1. The numeric values in the parentheses of the column of the polyorganosiloxane and the vinyl monomer (a2) in Table 1 represent the composition ratio (mass %) in 100 mass % of the rubber (A).

TABLE 1

|  |  |  | Examples | | | | | | |
|---|---|---|---|---|---|---|---|---|---|
|  |  |  | 1 | 2 | 3 | 4 | 5 | 6 | 7 |
| Rubber (A) portion | Graft copolymer |  | G-1 | G-2 | G-3 | G-4 | G-5 | G-6 | G-7 |
|  |  |  | A-1 | A-2 | A-3 | A-4 | A-5 | A-6 | A-7 |
|  | Polyorganosiloxane (solid content) | Type | $A_s$-1 | $A_s$-1 | $A_s$-1 | $A_s$-1 | $A_s$-1 | $A_s$-1 | $A_s$-1 |
|  |  | Amount [parts] | 30 (43) | 30 (43) | 30 (43) | 30 (43) | 30 (43) | 30 (43) | 30 (43) |
|  | Vinyl monomer (a2) [parts] | St | 39 (56) | 29 (42) | 19 (27) | 39 (56) | 29 (42) | 19 (27) | 40 (57) |
|  |  | nBA | — | 10 (14) | 20 (29) | — | 10 (14) | 20 (29) | — |
|  |  | AMA | 1 (1) | 1 (1) | 1 (1) | 1 (1) | 1 (1) | 1 (1) | — |
|  | Peroxide [parts] | CHP | 0.16 | 0.16 | 0.16 | 0.16 | 0.16 | 0.16 | 0.16 |
|  |  | KPS | — | — | — | — | — | — | — |
|  | Volume-average particle size (Dv) | [nm] | 433 | 454 | 455 | 449 | 455 | 440 | 404 |
|  | Number-average particle size (Dn) | [nm] | 373 | 386 | 417 | 380 | 387 | 380 | 351 |
|  | Dv/Dn | [—] | 1.16 | 1.18 | 1.09 | 1.18 | 1.18 | 1.16 | 1.15 |
|  | Index of refraction | [—] | 1.515 | 1.498 | 1.481 | 1.515 | 1.498 | 1.481 | 1.515 |
| Graft portion | Vinyl monomer (b) [parts] | MMA | 28.5 | 28.5 | 28.5 | — | — | — | 28.5 |
|  |  | MA | 1.5 | 1.5 | 1.5 | 1.5 | 1.5 | 1.5 | 1.5 |
|  |  | PhMA | — | — | — | 28.5 | 28.5 | 28.5 | — |
|  | Peroxide [parts] | tBH | 0.16 | 0.16 | 0.16 | 0.16 | 0.16 | 0.16 | 0.16 |
|  | Index of refraction | [—] | 1.489 | 1.489 | 1.489 | 1.565 | 1.565 | 1.565 | 1.489 |
| Index of refraction of graft copolymer |  | [—] | 1.507 | 1.496 | 1.483 | 1.53 | 1.519 | 1.506 | 1.507 |
| Volume-average particle size (Dv) of graft copolymer |  | [nm] | 525 | 539 | 539 | 545 | 547 | 528 | 473 |

|  |  |  | Examples | Comparative Examples | | | |
|---|---|---|---|---|---|---|---|
|  |  |  | 8 | 1 | 2 | 3 | 4 |
| Rubber (A) portion | Graft copolymer |  | G-8 | G-9 | G-10 | G-11 | G-12 |
|  |  |  | A-8 | A-9 | A-10 | A-11 | A-12 |
|  | Polyorganosiloxane (solid content) | Type | $A_s$-1 | $A_s$-1 | $A_s$-2 | $A_s$-1 | $A_s$-3 |
|  |  | Amount [parts] | 30 (43) | 30 (43) | 30 (43) | 10 (14) | 15 (21) |
|  | Vinyl monomer (a2) [parts] | St | 39 (56) | — | 7 (10) | — | 17 (24) |
|  |  | nBA | — | 39 (56) | 32 (46) | 59 (85) | 37 (53) |
|  |  | AMA | 1 (1) | 1 (1) | 1 (1) | 1 (1) | 1 (1) |

TABLE 1-continued

|  |  |  |  |  |  |  |  |
|---|---|---|---|---|---|---|---|
|  | Peroxide [parts] | CHP | — | 0.16 | 0.16 | 0.16 | — |
|  |  | KPS | 0.2 | — | — | — | 0.14 |
|  | Volume-average particle size (Dv) | [nm] | 527 | 461 | 210 | 635 | 222 |
|  | Number-average particle size (Dn) | [nm] | 456 | 423 | 155 | 548 | 147 |
|  | Dv/Dn | [—] | 1.16 | 1.09 | 1.35 | 1.16 | 1.51 |
|  | Index of refraction | [—] | 1.515 | 1.449 | 1.473 | 1.46 | 1.487 |
| Graft portion | Vinyl monomer (b) [parts] | MMA | 28.5 | 28.5 | 28.5 | 28.5 | 28.5 |
|  |  | MA | 1.5 | 1.5 | 1.5 | 1.5 | 1.5 |
|  |  | PhMA | — | — | — | — | — |
|  | Peroxide [parts] | tBH | — | 0.16 | 0.16 | 0.16 | — |
|  | Index of refraction | [—] | 1.489 | 1.489 | 1.489 | 1.489 | 1.489 |
| Index of refraction of graft copolymer |  | [—] | 1.507 | 1.461 | 1.478 | 1.469 | 1.488 |
| Volume-average particle size (Dv) of graft copolymer |  | [nm] | 561 | 582 | 240 | 685 | 255 |

The abbreviations in Table 1 are as follows.
St: styrene
nBA: n-butyl acrylate
AMA: allyl methacrylate
MMA: methyl methacrylate
PhMA: phenyl methacrylate
MA: methacrylate
tBH: t-butyl hydroperoxide
CHP: cumene hydroperoxide
KPS: potassium persulfate.

Example 9 to Example 16, Comparative Example 5 to Comparative Example 9

The powder of each of the polyorganosiloxane-containing graft copolymer (G-1) to the polyorganosiloxane-containing graft copolymer (G-12) and a polycarbonate resin (made by Mitsubishi Engineering Plastics Co., Ltd., trade name: Iupilon S-2000F, viscosity-average molecular weight: 24,000) were prepared with the ratios recited in Table 2, and then 0.1 parts of Irganox 1076 (made by BASF) used as additive, 0.1 parts of ADK STAB 2112 (made by ADEKA), and 0.1 parts of carbon black #960 (made by Mitsubishi Chemical Co., Ltd.) used as a colorant were added to mix. The mixture was provided to a 30 mmΦ biaxial extruder (L/D=30) to perform melt mixing and extrusion at a barrel temperature of 280° C. and a screw rotation speed of 150 rpm to obtain particles of a thermoplastic resin composition (H-1) to a thermoplastic resin composition (H-13).

After the resulting particles were dried at 80° C. for 12 hours, the particles were provided to a 100 t injection molding machine (made by Sumitomo Heavy Industries, Ltd., trade name: SE-100DU), and injection molding was performed at a barrel temperature of 280° C. and a mold temperature of 80° C. to obtain each "test piece 1" and each "test piece 2". Then, measurements of Charpy impact strength and pigment colorability were performed using each test piece. The evaluation results are shown in Table 2.

TABLE 2

|  |  | Examples |  |  |  |  |  |  |  | Comparative examples |  |  |  |  |
|---|---|---|---|---|---|---|---|---|---|---|---|---|---|---|
|  |  | 9 | 10 | 11 | 12 | 13 | 14 | 15 | 16 | 5 | 6 | 7 | 8 | 9 |
| Thermoplastic resin composition |  | H-1 | H-2 | H-3 | H-4 | H-5 | H-6 | H-7 | H-8 | H-9 | H-10 | H-11 | H-12 | H-13 |
| Graft copolymer | Type | G-1 | G-2 | G-3 | G-4 | G-5 | G-6 | G-7 | G-8 | G-9 | G-10 | G-11 | G-12 | — |
|  | Amount [parts] | 3 | 3 | 3 | 3 | 3 | 3 | 3 | 3 | 3 | 3 | 3 | 3 | — |
| Polycarbonate resin [parts] |  | 97 | 97 | 97 | 97 | 97 | 97 | 97 | 97 | 97 | 97 | 97 | 97 | 100 |
| Charpy impact strength | 23° C. [kJ/m²] | 65 | 65 | 69 | 71 | 65 | 68 | 59 | 59 | 68 | 59 | 59 | 59 | 67 |
|  | −30° C. | 23 | 28 | 24 | 28 | 28 | 27 | 20 | 20 | 27 | 15 | 21 | 17 | 14 |
| Pigment colorability (L*) |  | 4 | 4 | 6 | 3 | 3 | 4 | 5 | 5 | 9 | 11 | 7 | 11 | 2 |

Example 17 to Example 24, Comparative Example 10 to Comparative Example 14

Powders of the polyorganosiloxane-containing graft copolymer (G-1) to the polyorganosiloxane-containing graft copolymer (G-12) and a polycarbonate resin (made by Mitsubishi Engineering Plastics Co., Ltd., trade name: Iupilon S-2000F, viscosity-average molecular weight: 24,000) were prepared with the ratios recited in Table 3, and then 0.1 parts of carbon black #960 (made by Mitsubishi Chemical Co., Ltd.) used as a colorant was added to mix. The mixture was provided to a 30 mmΦ biaxial extruder (L/D=30) to perform melt mixing and extrusion at a barrel temperature of 280° C. and a screw rotation speed of 150 rpm to obtain particles of thermoplastic resin compositions (I-1 to I-13).

After the resulting particles were dried at 80° C. for 12 hours, the particles were provided to a 100 t injection molding machine (made by Sumitomo Heavy Industries, Ltd., trade name: SE-100DU), and injection molding was performed at a barrel temperature of 280° C. and a mold temperature of 80° C. to obtain each "test piece 3". Then, measurements of Charpy impact strength and pigment colorability and UL-94V test were performed using each test piece. The evaluation results are shown in Table 3.

In the thermoplastic resin composition (H-10) and the thermoplastic resin composition (H-12) of comparative example 6 and comparative example 8, the volume-average particle size of each of the rubber (A-10) and the rubber (A-12) forming each of the graft copolymers is small, and therefore the low-temperature impact resistance and the pigment colorability are poor.

The thermoplastic resin composition (H-13) of comparative example 9 does not contain a graft copolymer, and therefore the low-temperature impact resistance is poor.

TABLE 3

|  |  | Examples | | | | | | | | Comparative examples | | | | |
| --- | --- | --- | --- | --- | --- | --- | --- | --- | --- | --- | --- | --- | --- | --- |
|  |  | 17 | 18 | 19 | 20 | 21 | 22 | 23 | 24 | 10 | 11 | 12 | 13 | 14 |
| Thermoplastic resin composition | | I-1 | I-2 | I-3 | I-4 | I-5 | I-6 | I-7 | I-8 | I-9 | I-10 | I-11 | I-12 | I-13 |
| Craft copolymer | | G-1 | G-2 | G-3 | G-4 | G-5 | G-6 | G-7 | G-9 | G-9 | G-10 | G-11 | G-12 | — |
|  |  | 5 | 5 | 5 | 5 | 5 | 5 | 5 | 5 | 5 | 5 | 5 | 5 | — |
| Polycarbonate resin [parts] | | 90 | 90 | 90 | 90 | 90 | 90 | 90 | 90 | 90 | 90 | 90 | 90 | 95 |
| PX-200 [parts] | | 5 | 5 | 5 | 5 | 5 | 5 | 5 | 5 | 5 | 5 | 5 | 5 | 5 |
| A-3800 [parts] | | 1 | 1 | 1 | 1 | 1 | 1 | 1 | 1 | 1 | 1 | 1 | 1 | 1 |
| Charpy impact strength | 23° C. | 58 | 56 | 57 | 52 | 55 | 54 | 52 | 51 | 55 | 25 | 61 | 50 | 8 |
|  | −30° C. | 15 | 15 | 14 | 14 | 14 | 15 | 14 | 13 | 15 | 8 | 12 | 9 | 8 |
| Pigment colorability (L*) | | 10 | 13 | 14 | 11 | 10 | 11 | 10 | 9 | 17 | 17 | 12 | 17 | 2 |
| UL-94 | Total burn time [sec] | 71 | 112 | 89 | 74 | 31 | 39 | 59 | 54 | 76 | 42 | 107 | 204 | 98 |
|  | Longest burn time [sec] of one test piece | 20 | 28 | 17 | 23 | 7 | 14 | 25 | 21 | 29 | 15 | 18 | 80 | 29 |
|  | Drips | Not burnt | Not burnt | Not burnt | Not burnt | Not burnt | Not burnt | Not burnt | Not burnt | Not burnt | Not burnt | Burnt | Not burnt | Burnt |
|  | Result | V1 | V1 | V1 | V1 | V0 | V1 | V1 | V1 | V1 | V1 | Failure | Failure | Failure |

The abbreviations in Table 3 are as follows.
PX-200: aromatic phosphate-based flame retardant (PX-200 made by Daihachi Chemical Industry Co., Ltd.)
A-3800: polytetrafluoroethylene-containing powder (Metablen A-3800 made by Mitsubishi Rayon Co., Ltd.)

Analysis of Examples and Comparative Examples

The graft copolymer (G-1) to the graft copolymer (G-8) of example 1 to example 8 adopt styrene as the vinyl monomer (a2) for rubber, and therefore the index of refraction of each of the rubber (A-1) to the rubber (A-8) is in the range of 1.47 to 1.56, and the volume-average particle size of each of the rubbers is in the range of 300 nm to 2000 nm.

In the graft copolymer (G-9) and the graft copolymer (G-11) of comparative example 1 and comparative example 3, the index of refraction of each of the rubber (A-9) and the rubber (A-11) is lower than 1.47.

In the graft copolymer (G-10) and the graft copolymer (G-12) of comparative example 2 and comparative example 4, the particle size of each of the polyorganosiloxane latex $(A_s$-2) and the polyorganosiloxane latex $(A_s$-3) is small, and therefore the volume-average particle size of each of the rubber (A-10) and the rubber (A-12) is less than 300 nm.

In the thermoplastic resin composition (H-1) to the thermoplastic resin composition (H-8) of example 9 to example 16, the index of refraction of each of the rubber (A-1) to the rubber (A-8) forming each of the graft copolymer (G-1) to the graft copolymer (G-8) is in the range of 1.47 to 1.56, and the volume-average particle size of each of the rubber is in the range of 300 nm to 2000 nm, and therefore the low-temperature impact resistance and the pigment colorability are both good.

In the thermoplastic resin composition (H-9) of comparative example 5, the index of refraction of each of the rubbers (A-9) forming each of the graft copolymers is low, and therefore the pigment colorability is poor.

In the thermoplastic resin composition (I-1) to the thermoplastic resin composition (I-8) of example 17 to example 24, the index of refraction of each of the rubber (A-1) to the rubber (A-8) forming the graft copolymers is in the range of 1.47 to 1.56, and the volume-average particle size of each of the rubbers is in the range of 300 nm to 2000 nm, and therefore the low-temperature impact resistance, the pigment colorability, and the flame retardance are all good.

In the thermoplastic resin composition (I-9) of comparative example 10, the index of refraction of the rubber (A-9) forming the graft copolymer is low, and therefore the pigment colorability is poor.

In the thermoplastic resin composition (I-10) of comparative example 11, the volume-average particle size of the rubber (A-10) forming the graft copolymer is small, and therefore the low-temperature impact resistance and the pigment colorability are poor.

In the thermoplastic resin composition (I-11) of comparative example 12, the content of polyorganosiloxane in the rubber (A-11) forming the graft copolymer is low, and therefore the flame retardance is poor.

In the thermoplastic resin composition (I-12) of comparative example 13, the volume-average particle size of the rubber (A-12) forming the graft copolymer is small, and the content of polyorganosiloxane in the rubber is low, and therefore the low-temperature impact resistance and the flame retardance are poor.

The thermoplastic resin composition (I-13) of comparative example 14 does not contain a graft copolymer, and therefore the low-temperature impact resistance and the flame retardance are poor.

INDUSTRIAL APPLICABILITY

The molded product obtained from the graft copolymer or the thermoplastic resin composition of the invention can be extensively used in industries as a material in, for instance, the automotive field, the OA equipment field, or the electrical/electronic field.

The invention claimed is:

1. A polyorganosiloxane-containing graft copolymer obtained by polymerizing a grafting vinyl monomer (b) in the presence of a rubber (A) comprising a polyorganosiloxane (A1) and a vinyl polymer (A2), wherein the rubber (A) has an index of refraction in a range of 1.47 to 1.56, and a volume-average particle size of in a range of 300 nm to 2000 nm.

2. The polyorganosiloxane-containing graft copolymer of claim 1, wherein the rubber (A) is a composite rubber comprising the polyorganosiloxane (A1) and the vinyl polymer (A2).

3. The polyorganosiloxane-containing graft copolymer of claim 1, wherein the polyorganosiloxane (A1) is obtained by polymerizing an organosiloxane mixture comprising an organosiloxane, where the organosiloxane is a cyclic dimethylsiloxane and/or a difunctional dialkyl silane compound.

4. The polyorganosiloxane-containing graft copolymer of claim 1, wherein the rubber (A) has a volume-average particle size in a range of 400 nm to 1000 nm.

5. The polyorganosiloxane-containing graft copolymer of claim 1, wherein the polyorganosiloxane (A1) is present in the rubber (A) in a range of 40 mass % to 80 mass %, and the vinyl polymer (A2) is present in a range of 60 mass % to 20 mass %.

6. The polyorganosiloxane-containing graft copolymer of claim 1, wherein the vinyl polymer (A2) is obtained by polymerizing a vinyl monomer (a2) for rubber using a free-radical polymerization initiator having a solubility of 5 mass % or less in water at 20° C.

7. The polyorganosiloxane-containing graft copolymer of claim 6, wherein the free-radical polymerization initiator is at least one selected from the group consisting of cumene hydroperoxide, diisopropyl benzene hydroperoxide, p-menthane hydroperoxide, t-butyl peroxy neodecanoate, t-butyl peroxyneoheptanoate, t-butyl peroxytrimethylacetate, 1,1,3,3-tetramethylbutyl peroxy-2-ethylhexanoate, t-butyl peroxy-2-ethyl hexanoate, 2,2'-azobisisobutyronitrile, dimethyl 2,2'-azobis(2-methylpropionate), 2,2'-azobis (2,4-dimethylvaleronitrile), and 2,2'-azobis (2-methylbutyronitrile).

8. The polyorganosiloxane-containing graft copolymer of claim 1, wherein the vinyl polymer (A2) comprises an aromatic vinyl monomer unit and/or an aryl (meth)acrylate unit having an ester group that is a phenyl group or a substituent phenyl group.

9. The polyorganosiloxane-containing graft copolymer of claim 1, wherein the rubber (A) contains 0 mass % to 35 mass % of an alkyl (meth)acrylate unit based on a total of 100 mass % of the rubber (A).

10. The polyorganosiloxane-containing graft copolymer of claim 6, wherein the vinyl monomer (a2) for rubber contains 0.1 mass % to 10 mass % of a crosslinking monomer based on a total of 100 mass % of the vinyl monomer (a2) for rubber.

11. The polyorganosiloxane-containing graft copolymer of claim 1, wherein the grafting vinyl monomer (b) comprises at least one selected from the group consisting of an aromatic vinyl monomer, an alkyl (meth)acrylate, a vinyl cyanide monomer, and an aryl (meth)acrylate having an ester group that is a phenyl group or a substituent phenyl group.

12. The polyorganosiloxane-containing graft copolymer of claim 1, wherein a polymer obtained by polymerizing the grafting vinyl monomer (b) has an index of refraction in a range of 1.50 to 1.60.

13. A thermoplastic resin composition comprising the polyorganosiloxane-containing graft copolymer of claim 1 and a thermoplastic resin.

14. The thermoplastic resin composition of claim 13, wherein the polyorganosiloxane-containing graft copolymer is present in a range of 0.5 mass % to 90 mass % based on a total of 100 mass % of the thermoplastic resin composition.

15. The thermoplastic resin composition of claim 13, wherein the thermoplastic resin is a polycarbonate resin.

16. A molded product obtained by molding the thermoplastic resin composition of claim 13.

* * * * *